US009236080B2

(12) United States Patent
Teicher

(10) Patent No.: US 9,236,080 B2
(45) Date of Patent: Jan. 12, 2016

(54) REMOVABLE MEDIUM WITH BOOKMARK

(75) Inventor: Mordechai Teicher, Hod Hasharon (IL)

(73) Assignee: SANDISK IL LTD., Kfar Saba (IL)

( * ) Notice: Subject to any disclaimer, the term of this patent is extended or adjusted under 35 U.S.C. 154(b) by 2423 days.

(21) Appl. No.: 11/016,777

(22) Filed: Dec. 21, 2004

(65) Prior Publication Data

US 2005/0157600 A1 Jul. 21, 2005

Related U.S. Application Data

(60) Provisional application No. 60/537,675, filed on Jan. 15, 2004.

(51) Int. Cl.
| | |
|---|---|
| *G11B 21/08* | (2006.01) |
| *G11B 7/007* | (2006.01) |
| *G11B 23/30* | (2006.01) |
| *G11B 27/10* | (2006.01) |
| *G11B 27/32* | (2006.01) |

(52) U.S. Cl.
CPC ............ *G11B 7/00736* (2013.01); *G11B 23/30* (2013.01); *G11B 27/102* (2013.01); *G11B 27/105* (2013.01); *G11B 27/322* (2013.01); *G11B 27/329* (2013.01); *G11B 2220/20* (2013.01); *G11B 2220/215* (2013.01); *G11B 2220/2545* (2013.01); *G11B 2220/2562* (2013.01)

(58) Field of Classification Search
USPC .......... 369/30.03, 30.04, 30.05, 30.06, 30.07, 369/30.08, 30.09, 47.1, 53.2, 53.41; 386/125, 126, 238, 248, 252, 262; 710/5, 13, 7; 700/94
See application file for complete search history.

(56) References Cited

U.S. PATENT DOCUMENTS

| 4,338,644 A | 7/1982 | Staar |
| 5,404,485 A | 4/1995 | Ban |

(Continued)

FOREIGN PATENT DOCUMENTS

| EP | 0322037 | 6/1989 |
| EP | 1 100 001 | 5/2001 |

(Continued)

OTHER PUBLICATIONS

Japanese Official Action for Japanese Patent Application No. 2006-548574 (Oct. 23, 2009).

(Continued)

*Primary Examiner* — Tan X Dinh
(74) *Attorney, Agent, or Firm* — Jenkins, Wilson, Taylor & Hunt, P.A.

(57) ABSTRACT

A storage medium includes a content storage portion for storing content and a bookmark storage portion for storing a bookmark value. An associated player for playing the content includes a user interface for presenting the content to a user, a processor for presenting the content to the user interface starting at a starting segment of the content in accordance with the bookmark value, and a medium interface for reversibly operationally connecting the player to the storage medium to deliver the content and the bookmark value to the processor. The player plays the content until an ending segment is reached, and sets the bookmark value in accordance with the ending segment, so that subsequent playing, on the same player or on a different player, starts in accordance with the ending segment. The starting segment is selected either by the player or by the storage medium.

7 Claims, 6 Drawing Sheets

(56) References Cited

U.S. PATENT DOCUMENTS

| | | |
|---|---|---|
| 5,799,168 A | 8/1998 | Ban |
| 5,831,946 A * | 11/1998 | De Bie .................. 369/30.36 |
| 5,890,015 A | 3/1999 | Garney et al. |
| 5,928,347 A * | 7/1999 | Jones ........................ 710/305 |
| 5,928,847 A | 7/1999 | Visconte et al. |
| 5,930,472 A | 7/1999 | Smith |
| 5,966,720 A | 10/1999 | Itoh et al. |
| 5,974,008 A * | 10/1999 | Lee ........................... 369/30.36 |
| 6,148,354 A | 11/2000 | Ban |
| 6,182,204 B1 | 1/2001 | Nakashima |
| 6,188,650 B1 * | 2/2001 | Hamada et al. ............ 369/30.36 |
| 6,256,690 B1 | 7/2001 | Carper |
| 6,279,069 B1 | 8/2001 | Robinson et al. |
| 6,360,057 B1 | 3/2002 | Tsumagari et al. |
| 6,388,961 B1 * | 5/2002 | Ijichi ........................ 369/30.36 |
| 6,405,278 B1 | 6/2002 | Liepe |
| 6,484,290 B1 | 11/2002 | Chien et al. |
| 6,504,571 B1 | 1/2003 | Narayanaswami et al. |
| 6,581,122 B1 | 6/2003 | Sarat |
| 6,594,361 B1 | 7/2003 | Chaney et al. |
| 6,657,679 B2 | 12/2003 | Hayes et al. |
| 6,757,783 B2 * | 6/2004 | Koh ........................... 711/115 |
| 6,779,063 B2 * | 8/2004 | Yamamoto .................. 710/74 |
| 6,804,749 B2 | 10/2004 | Chien et al. |
| 6,886,083 B2 * | 4/2005 | Murakami ................... 711/156 |
| 6,961,585 B2 | 11/2005 | Minematsu |
| 7,016,268 B2 * | 3/2006 | Yoshida et al. ............ 369/30.24 |
| 7,054,660 B2 | 5/2006 | Lord |
| 7,099,239 B2 * | 8/2006 | Ogikubo ..................... 369/30.23 |
| 7,107,045 B1 | 9/2006 | Knoop |
| 7,130,608 B2 | 10/2006 | Hollström et al. |
| 7,301,857 B2 * | 11/2007 | Shah et al. ................. 369/30.24 |
| 7,426,584 B2 | 9/2008 | Moran et al. |
| 2001/0037420 A1 | 11/2001 | Sakamoto |
| 2002/0099797 A1 | 7/2002 | Merrell et al. |
| 2003/0120604 A1 | 6/2003 | Yokota et al. |
| 2003/0154326 A1 * | 8/2003 | Tseng et al. ..................... 710/1 |
| 2004/0008970 A1 * | 1/2004 | Junkersfeld et al. ............ 386/69 |
| 2004/0028068 A1 | 2/2004 | Kizhepat |
| 2004/0073727 A1 | 4/2004 | Moran et al. |
| 2004/0209651 A1 | 10/2004 | Tsukamoto |
| 2004/0235521 A1 | 11/2004 | Pradhan et al. |
| 2006/0154648 A1 | 7/2006 | Oh et al. |
| 2007/0078917 A1 | 4/2007 | Edrey |

FOREIGN PATENT DOCUMENTS

| | | |
|---|---|---|
| EP | 1411520 | 4/2004 |
| JP | 03-222148 | 10/1991 |
| JP | 11-273230 | 10/1999 |
| JP | 2000-013237 A | 1/2000 |
| JP | 2000-331422 | 11/2000 |
| JP | 2001195553 | 7/2001 |
| JP | 2001-229657 | 8/2001 |
| JP | 2003-259303 | 9/2003 |
| WO | WO 2005/067377 A2 | 7/2005 |

OTHER PUBLICATIONS

Examiner's Answer for U.S. Appl. No. 11/519,970 (Dec. 8, 2010).
Notice of Panel Decision for Pre-Appeal Brief Review for U.S. Appl. No. 11/519,970 (May 4, 2010).
Japanese Final Official Action for Japanese Patent Application No. 2006-548474 (Apr. 30, 2010).
Communication pursuant to Article 94(3) EPC for European application No. 04806679.9 (Oct. 23, 2009).
Final Official Action for U.S. Appl. No. 11/519,970 (Sep. 22, 2009).
Official Action for U.S. Appl. No. 11/519,970 (Feb. 27, 2009).
European Search Report for European application No. 04806679.9 (Aug. 14, 2008).
Notice of Allowance and Fee(s) Due for U.S. Appl. No. 10/268,892 (Dec. 19, 2007).
Interview Summary for U.S. Appl. No. 10/268,892 (Nov. 16, 2007).
Final Official Action for U.S. Appl. No. 10/268,892 (Jul. 17, 2007).
Official Action for U.S. Appl. No. 10/268,892 (Feb. 20, 2007).
Advisory Action for U.S. Appl. No. 10/268,892 (Jun. 1, 2006).
Final Official Action for U.S. Appl. No. 10/268,892 (Apr. 6, 2006).
Notification of Transmittal of the International Search Report and the Written Opinion of the International Searching Authority, or the Declaration for International Application No. PCT/IL2004/01148 (Dec. 21, 2005).
Official Action for U.S. Patent Application U.S. Appl. No. 10/268,892 (Oct. 25, 2005).
Advisory Action for U.S. Appl. No. 10/268,892 (Jul. 20, 2005).
Final Official Action for U.S. Appl. No. 10/268,892 (May 18, 2005).
Official Action for U.S. Appl. No. 10/268,892 (Nov. 29, 2004).
Advisory Action for U.S. Appl. No. 10/268,892 (Sep. 16, 2004).
Final Official Action for U.S. Appl. No. 10/268,892 (Jun. 30, 2004).
Official Action for U.S. Appl. No. 10/268,892 (Mar. 4, 2004).
Official Action for U.S. Appl. No. 10/268,892 (Dec. 19, 2003).
Ban, "Local Flash Disks: Two Architectures Compared," White Pater, M-Systems Flash Disk Pioneers (Aug. 2001).
Glass, "There in a Flash: Flash Memory for Embedded Systems," available at www.embedded.com (Copyright 2000).
Intel AP-686 Application Note, "Flash File System Selection Guide," (Dec. 1998).
Advisory Action for U.S. Appl. No. 11/519,970 (May 12, 2011).

* cited by examiner

REMOVABLE MEDIUM WITH BOOKMARK

This application claims the benefit of U.S. Provisional Patent Application No. 60/537,675, filed Jan. 15, 2004.

FIELD AND BACKGROUND OF THE INVENTION

The present invention relates to removable storage devices and, more particularly, to direct access removable media that include writable media.

Audio, video or text content is often stored on removable media that can be moved from one player to another. In many scenarios the user may wish to interrupt consuming a piece of content on one player and resume consumption on another player. For example, one may start listening to a recorded story in his/her car and end listening at home. Similarly, one may wish to view part of a training video at home and see the rest in the office.

Removable media can be categorized into three main groups: tapes, disks (magnetic or optical), and nonvolatile solid state memories. Tapes are sequential by nature, while disks and nonvolatile memories offer random access, i.e. the ability to access directly any segment within the content stored on the medium without passing through other segments. While tape users suffer from the hassle of rewinding and fast-forwarding, they benefit from a unique advantage: when a tape is moved from one player to another, it is positioned exactly at the point of interruption, allowing seamless transition between the first and second sessions. A disk or a solid-state memory, on the other hand, may have the hosting player maintaining the point of interruption as long as it stays in the player, but this point is lost when the medium is removed from the player, thus requiring the user to write down the coordinates of the point of interruption or to browse through the content in order to find this point when the medium is inserted for another session of playback, at same or another player.

There is thus a need to assist users of a random-access removable medium in resuming consumption of content from the point of interruption, even after removal of the medium from the player.

DEFINITIONS

By "content" is meant a digital form of text, audio and/or video data to be "consumed" or "played", i.e. read, listened to and/or viewed, by a "user". A "content piece", also abbreviated a "piece", is a unit of content that most users desire to consume in its entirety, even if in parts. Examples of a content piece include an electronic book, a movie, an audio story, a symphony, and an educational lecture.

A "segment" is an atomic part of a content piece that can be accessed by its "address". For example, a video movie or a symphony can be thought of as divided into 1-second segments, addressed by counting the playing time in seconds from the beginning of the piece. Alternative segmentation and addressing paradigms relate to the way the media storage is organized in physical and logical blocks and are well known in the art.

By "playing in parts" or "consuming in parts" is meant consuming a content piece within two or more "sessions"; in the case of playing in parts, content consumption is "interrupted" and later "resumed" from the point of interruption or close to that point. By "bookmark value" is meant a record of the point of interruption. By "bookmark storage" is meant a storage area or storage device for keeping such a record.

By "random access removable medium", also abbreviated "removable medium" or "medium", is meant a storage device for non-volatile storage of content, based on magnetic, solid-state, optical or any equivalent storage technology, that allows direct access to selectable segments within the content. Magnetic and optical disks and flash memories are examples of random access removable media, while magnetic tapes are an example of storage that does not support random access and will therefore be excluded from the present discussion.

By "player" is meant a device for inserting removable media therein and employing a user interface for playing the content. Examples include a DVD or CD player, a personal computer, and a portable music or video player that receives a flash memory storage device that is preloaded with content.

SUMMARY OF THE INVENTION

The present invention seeks to provide systems and functionalities to allow seamless consumption in parts of a content piece. Thus, a user may insert a random access removable medium containing the content piece into a player, play part of the content, remove the medium from the player, and then insert the medium in the same player or a different player to resume consumption from the point of interruption or close to this point.

Therefore, according to the present invention there is provided a storage medium, adapted to be reversibly operationally connected to any one of at least one player of content stored in the storage medium, each of the at least one player including a user interface for starting and stopping the playing of the content, the storage medium including: (a) a content storage portion for storing the content; and (b) a bookmark storage portion for storing a bookmark value of the content in accordance with the stopping of the playing via the user interface.

Furthermore, according to the present invention there is provided a storage medium, adapted to be reversibly operationally connected to a player of content stored in the storage medium, the storage medium including: (a) a content storage portion for storing the content; (b) a bookmark storage portion for storing a bookmark value of the content; and (c) a controller for providing the content to the player in accordance with the bookmark value in response to a request for the content from the player and for storing the bookmark value in response to the player ceasing to play the content.

Furthermore, according to the present invention there is provided a system including: (a) at least one player for playing content, each at least one player including a user interface for starting and stopping the playing; and (b) a storage medium, adapted to be reversibly operationally connected to any one of the at least one player, the storage medium including: (i) a content storage portion for storing the content, and (ii) a bookmark storage portion for storing a bookmark value of the content in accordance with the stopping of the playing via the user interface.

Furthermore, according to the present invention there is provided a player, of content that is stored in a storage medium along with a bookmark value, the player including: (a) a user interface for presenting the content to a user of the player, the user interface supporting at least one user command that defines an ending segment of the content; (b) a medium interface for reversibly operationally connecting the player to the storage medium; and (c) a processor for receiving the content and the bookmark value from the storage medium via the medium interface, for providing the content to the user interface starting at a starting segment of the content selected in accordance with the bookmark value, and for setting the bookmark value in accordance with the ending segment.

Furthermore, according to the present invention there is provided a player, of content that is stored in a storage medium along with a bookmark value and code for playing the content, the player including: (a) a user interface for presenting the content to a user of the player, the user interface supporting at least one user command that defines an ending segment of the content; (b) a medium interface for reversibly operationally connecting the player to the storage medium; and (c) a processor for: (i) receiving the content, the bookmark value and the code from the storage medium via the medium interface, and (ii) executing the code, thereby providing the content to the user interface starting at a starting segment of the content selected in accordance with the bookmark value and setting the bookmark value in accordance with the ending segment.

Furthermore, according to the present invention there is provided a method of playing content, including the steps of: (a) storing the content in a storage medium; (b) reversibly operationally connecting the storage medium to a first player; (c) selecting an ending segment of the content, using the first player; and (d) storing a bookmark value in the storage medium in accordance with the ending segment.

Furthermore, according to the present invention there is provided a method of playing content, including the steps of: (a) storing both the content and a bookmark value in a storage medium; (b) requesting the content, by a player, independently of the bookmark value; (c) selecting a starting segment of the content in accordance with the bookmark value, by the storage medium; and (d) receiving the content, starting from the starting segment, by the player.

One basic storage medium of the present invention is adapted to be reversibly operationally connected to any player from a set of such players for playing content that is stored in the storage medium. Each player has a user interface for starting and stopping the playing of the content. The storage medium includes a content storage portion for storing the content and a bookmark storage portion for storing a bookmark value of the content in accordance with the stopping of the playing via the user interface. Preferably, only the player to which the storage medium is operationally connected, and not the storage medium, is operative to store the bookmark value in the bookmark storage portion of the storage medium.

The content storage portion may be permanent (i.e., read-only, as in a typical CD or DVD), recordable (i.e., a "write once" medium as in a recordable CD-R), or rewritable (as in a flash disk or a CD-RW). The bookmark storage portion preferably is rewritable or recordable.

Preferably, the storage medium includes a code storage portion for storing code that the player to which the storage medium is operationally connected executes to play the content. Most preferably, the code is for playing the content in accordance with the bookmark value.

Preferably, the storage medium includes an interface for reversibly operationally connecting the storage medium to one of the players. Most preferably, the storage medium also includes a controller for providing the content to the interface in accordance with the bookmark value.

Another basic storage medium of the present invention also is adapted to be reversibly operationally connected to a player for playing content that is stored in the storage medium. The storage medium includes a content storage portion for storing content, a bookmark storage portion for storing a bookmark value, and a controller for providing the content to the player in accordance with the bookmark value and in response to a request for the content from the player, and for storing the bookmark value in response to the player ceasing to play the content. Preferably, only the controller, and not the player, stores the bookmark value in the bookmark storage portion of the storage medium, and only the controller, and not the player, reads the bookmark value from the bookmark storage portion of the storage medium.

The scope of the present invention, with regard to the storage media of the present invention, specifically excludes known prior art mp3 players that store both content and bookmarks. Such an mp3 player is operative to be connected e.g. to a stereo system. The content of the mp3 player then is played on the stereo system. Such a mp3 player therefore can be construed as including a storage medium for content that is played on the stereo system. The first basic storage medium of the present invention is distinguished from these prior art mp3 players by the bookmark being set in accordance with an action taken using the user interface of the player, i.e., stopping the playing via the user interface. The second basic storage medium of the present invention also is distinguished from these prior art mp3 players by the bookmark being set in response to an action taken by the player, i.e., the player ceasing to play the content. This is in contrast to these prior art mp3 players, which manage their bookmarks themselves, without direction from the stereo system, and for which the stereo system is a passive recipient of the content.

A system of the present invention includes one or more players of the content, each player with a user interface for starting and stopping the playing, and also the first storage medium of the present invention. Preferably, only the player to which the storage medium is operationally connected is operative to store the bookmark value in the bookmark storage section of the storage medium. Preferably, the storage medium includes a code storage portion for storing code for playing the content and the player includes a processor for executing that code.

One basic player of the present invention, for playing content that is stored in a storage medium along with a bookmark value, includes a user interface for presenting the content (e.g., visually and/or aurally) to a user, a medium interface for reversibly operationally connecting the player to the storage medium, and a processor that receives the content and the bookmark value from the storage medium via the medium interface and provides the content to the user interface starting at a starting segment that is selected in accordance with the bookmark value. The user interface supports at least one user command that define(s) an ending segment of the content. The processor then is operative to set the bookmark value in accordance with the ending segment. Usually, the user command(s) that define the ending segment of the content has/have (a) different primary purpose(s). Typical such user commands include a "stop play" command entered by pressing a "stop" button on the user interface, a "pause play" command entered by pressing a "pause" button on the user interface, and/or an "eject storage medium" command entered by pressing an "eject" button on the user interface.

Preferably, the player also includes a memory for storing code that the processor executes to provide the content to the user interface starting at the starting segment.

Another basic player of the present invention, for playing content that is stored in a storage medium along with a bookmark value and code for playing the content, includes a user interface for presenting the content to a user, a medium interface for reversibly operationally connecting the player to the storage medium, and a processor that receives the content, the bookmark value and the code from the storage medium via the medium interface and that executes the code to present the content to the user interface starting at a starting segment that is selected in accordance with the bookmark value. As in the case of the first basic player of the present invention, the user interface supports at least one user command that define(s) an ending segment of the content. The processor executes the code to set the bookmark value in accordance with the ending segment.

According to one basic method of the present invention, for playing content, the content is stored in a storage medium. The storage medium is reversibly operationally connected to a first player. An ending segment of the content is selected, using the first player. A bookmark value then is stored in the storage medium in accordance with the ending segment.

Typically, the first player plays the content, preferably only until the ending segment is played. Preferably, code that is executed by the first player to play the content also is stored in the storage medium. Most preferably, the execution of the code is initiated by the reversible operational connection of the storage medium to the first player.

Preferably, the storing of the bookmark value sets the bookmark value so that subsequent playing of the content starts from the segment that is related to the ending segment, for example from the segment immediately following the ending segment or from a segment that precedes the ending segment in a predetermined manner. In this context, the segments are assumed to be ordered cyclically, so that if the ending segment is the last segment of the content, then the bookmark value is set so that subsequent playing of the content starts from the first segment of the content.

Also preferably, the storage medium is operationally disconnected from the first player and then reversibly operationally connected, either back to the first player or to a second player. A starting segment of the content is selected in accordance with the bookmark value, and the content is played by the player to which the storage medium now is operationally connected, starting from the starting segment.

According to another basic method of the present invention, for playing content, the content is stored along with a bookmark value in a storage medium. A player requests the content from the storage medium, independently of the bookmark value. That the request for the content is "independent" of the bookmark value means that the player is ignorant of the bookmark value and is merely requesting from the storage medium whatever content the storage medium is adapted to provide. The storage medium selects a starting segment of the content in accordance with the bookmark value and then provides the content to the player starting from the starting segment. Preferably, the player then plays the content starting from the starting segment.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a random access storage medium that provides for bookmarking the content stored thereon, a method of its use, and an associated system. Specifically, the present invention can be used to interrupt consumption of content stored on a random access medium and to resume consumption from the point of interruption.

The principles and operation of a storage medium according to the present invention may be better understood with reference to the drawings and the accompanying description.

The General Case

Figure 1:
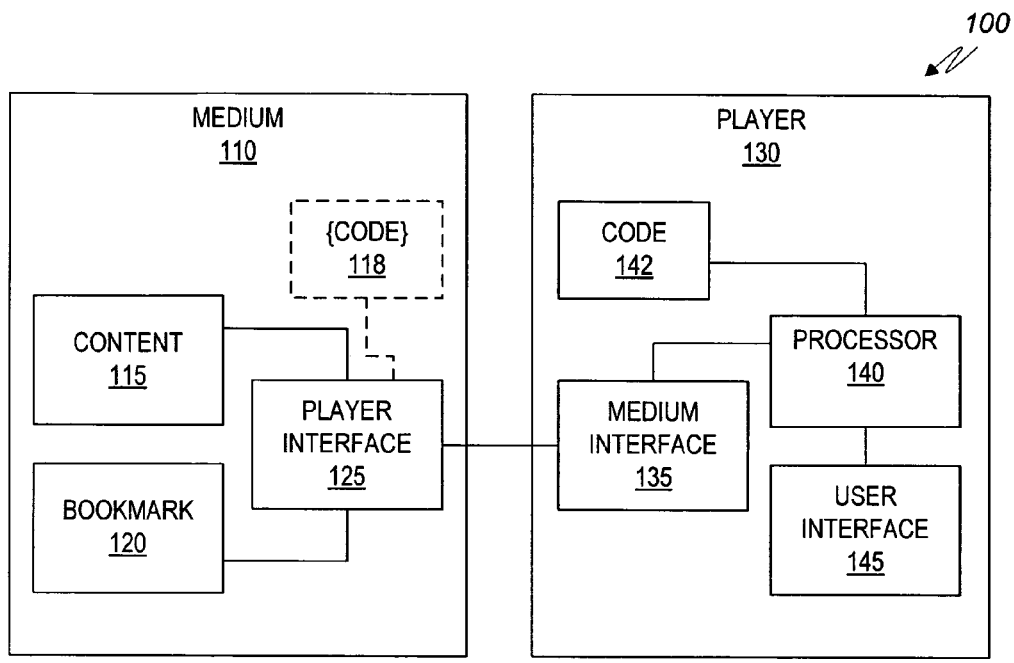
FIG. 1 is a simplified block diagram illustrating a general preferred embodiment of the present invention.

Reference is made to FIG. 1, which illustrates the general case of a preferred embodiment of the system of the present invention. System 100 includes a medium 110, and at least one player 130 for selectably receiving medium 110. Medium 110 is a random access removable medium, based for example on magnetic, optical, or solid-state storage technology. Medium 110 includes a content storage portion 115 for storing content, a bookmark storage portion 120 for storing a bookmark value, and optionally also a code storage portion 118 for storing program code. Bookmark storage portion 120 is a storage area that uses part of medium 110 to store the current location within the content upon interruption, i.e. the address of the last-played segment. Content storage portion 115 can be permanent (as in a commercial CD or DVD), recordable (as in recordable CD-R) or rewritable (as in a flash disk or a rewritable CD-RW). Player 130 has a processor 140 to convert the digital content received from storage portion 115 to an audio and/or visual format for user consumption via a user interface 145. Processor 140 is run under programs loaded from a memory 142 which forms part of player 130, and optionally also under programs loaded from code storage portion 118 that is included in medium 110. A user interface 145 allows the user of system 100 to see and/or hear content received from content storage portion 115, as well as to enter commands such as play, pause, stop, sound and/or video control, etc. Medium 110 also includes a player interface 125. Player 130 also includes a corresponding medium interface 135. Medium interface 135 and player interface 125 are used for physical, electrical and logical coupling between player 130 and medium 110, to allow transfer of content from content storage portion 115 to processor 140; for example, if medium 110 is a flash memory, then player interface 125 and medium interface 135 may be the client and host sides, respectively, of CompactFlash, USB or MultiMedia card interfaces. If medium 110 is an optical disk, then medium interface 135 is a disk drive while player interface 125 is just the compliance with the respective disk standards. Under some preferred embodiments, processor 140 also has the functionality of reading and recording the content of bookmark storage portion 120, as explained below with respect to FIGS. 2A-2B; alternatively bookmark storage portion 120 is managed by medium 110, as described below with respect to FIGS. 5-6.

It will be appreciated that when player 130 receives medium 110, user commands that relate to or affect bookmark storage portion 120, such as start or stop playing, respectively, are entered at user interface 145.

Exemplary Preferred Embodiments

Figure 1A:
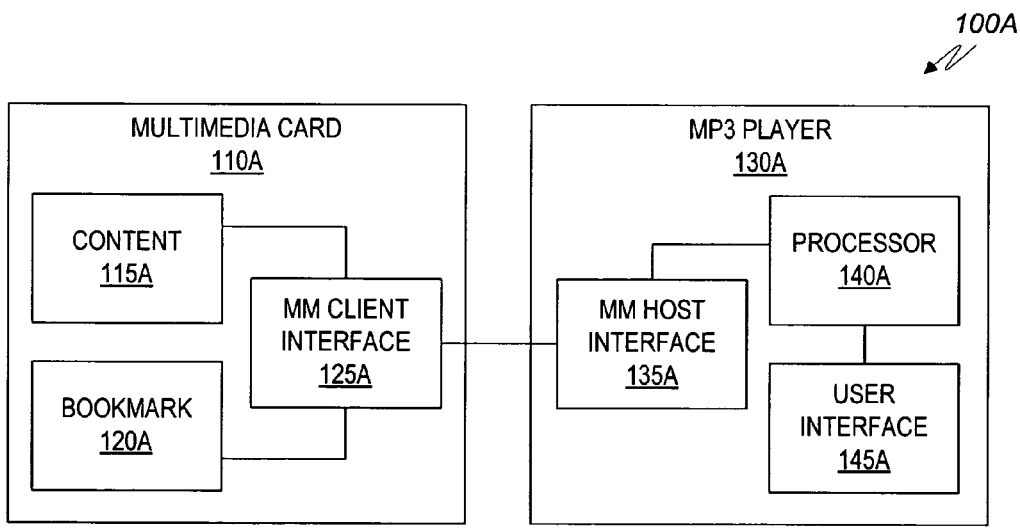
FIG. 1A is a simplified block diagram illustrating a first special case of the preferred embodiment of FIG. 1.

FIG. 1A schematically illustrates a specific preferred embodiment 100A of the general case of FIG. 1. In FIG. 1, a MultiMedia flash card 110A is used as medium 110. A content storage portion 115A uses flash storage to store, for example, a symphony previously downloaded in MP3 format from the Internet via a personal computer equipped with a compatible MultiMedia card adaptor (not shown). A bookmark storage portion 120A is also part of the flash memory. A MultiMedia client interface 125A cooperates with a MultiMedia host interface 135A of a MP3 player 130A under the MultiMedia card standard. Player 130A employs a processor 140A to transform digital content received from content storage portion 115A into an analog form that is presented to the user via a user interface 145A. Processor 140A also has the functionality of reading and updating the content of bookmark storage portion 120A, as explained below with respect to FIGS. 2A-2B.

Figure 1B:
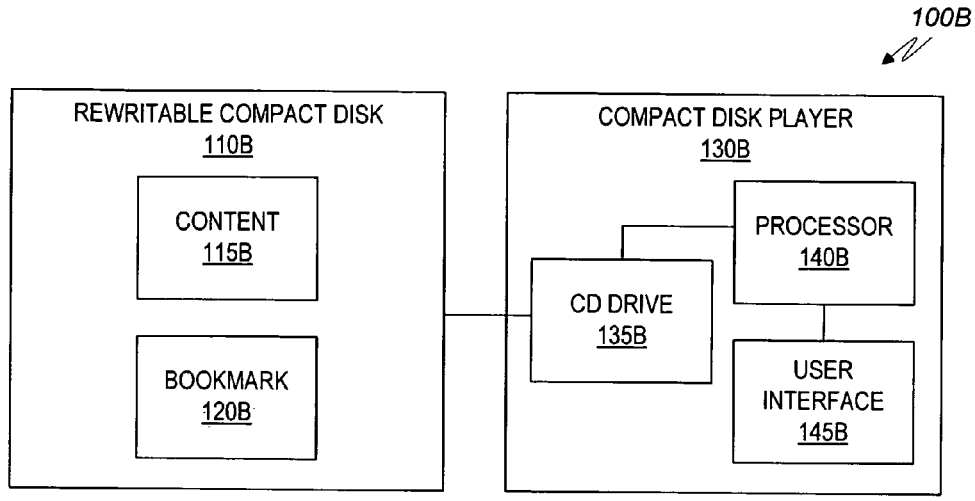
FIG. 1B is a simplified block diagram illustrating a second special case of the preferred embodiment of FIG. 1.

FIG. 1B schematically illustrates another specific preferred embodiment 100B of the general case of FIG. 1. In FIG. 1B, a rewritable compact disk 110B is used as medium 110. A content storage portion 115B uses rewritable compact disk media for storage. A bookmark storage portion 120B is also part of the rewritable medium. A CD drive 135B of a compact disk player 130B is the representation in FIG. 1B of medium interface 135 of FIG. 1. CD drive 135B receives compact disk 110B for read/write operations. Player interface 125 of FIG. 1 is implicit in the embodiment of FIG. 1B by the compliance of the characteristics of rewritable compact disk 110B with the standards of a rewritable compact disk, and therefore is not shown explicitly in FIG. 1B. Compact disk player 130B uses a processor 140B to transform digital content received from content storage portion 115B into an analog form that is presented to the user via a user interface 145B. Processor 140B also has the functionality of reading and updating the content of bookmark storage portion 120B, as explained below with respect to FIGS. 2A-2B.

Figure 1C:
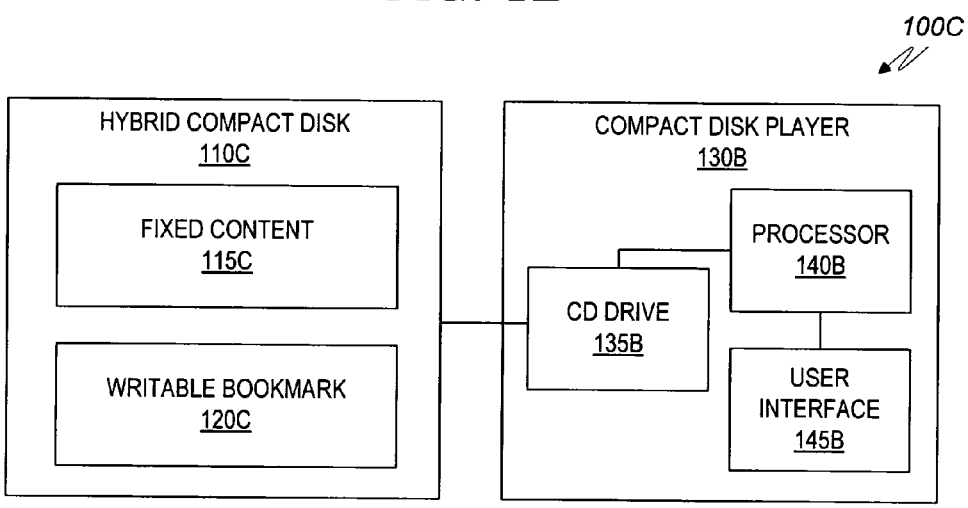
FIG. 1C is a simplified block diagram illustrating a third special case of the preferred embodiment of FIG. 1.

FIG. 1C schematically illustrates still another specific preferred embodiment 100C of the general case of FIG. 1. Embodiment 100C is similar to embodiment 100B of FIG. 1B, except that a compact disk medium 110C that replaces compact disk 110B is a hybrid: compact disk 110C includes a fixed, read-only (i.e. non-writable) area 115C for storing the content, and a writable or rewritable area 120C that serves as bookmark storage portion 120 of FIG. 1. Compact disk player 130B is as in preferred embodiment 100B of FIG. 1B.

Figure 1D:
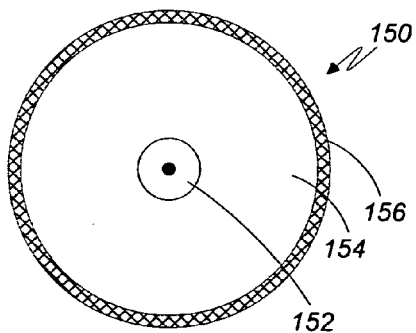
FIG. 1D is a pictorial illustration of a first exemplary implementation of the case of FIG. 1C.
Figure 1E:
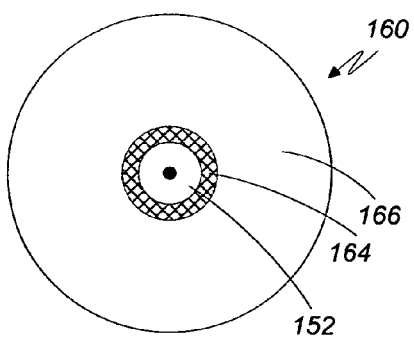
FIG. 1E is a pictorial illustration of a second exemplary implementation of the case of FIG. 1C.

FIG. 1D schematically illustrates a preferred physical arrangement 150 of hybrid compact disk 110C of FIG. 1C. Hybrid compact disk 150 includes an inner circular aperture 152 arranged conventionally to hold and spin the disk, an inner annulus 154 conventionally constructed, pressed and coated as in common commercial CDs or DVDs, and an outer annulus 156 coated as in conventional CD-R or CD-RW designs. Thus inner annulus 154 serves as fixed content storage portion 115C of FIG. 1C, while outer annulus 156 serves as bookmark storage portion 120C of FIG. 1C. FIG. 1E illustrates an alternative design 160 of a hybrid compact disk, wherein an inner annulus 164 is writable and serves as bookmark storage portion 120C of FIG. 1C, while an outer annulus 166 serves as fixed content storage portion 115C of FIG. 1C.

Writable and Rewritable Media

As is described below, the bookmark value in bookmark storage portion 120 of FIG. 1 is updated at least when content consumption is interrupted. When a rewritable medium, such as a flash memory or a rewritable CD is used, recording is straightforward. However, it will be appreciated that also a write-once medium, such as writable CD or DVD, can be used. This is because bookmark storage portion 120 needs to store just the address of interruption, which is a very small amount of data; even if a block of 512B of data is used for each interruption, then 1 MB of storage, easily affordable to any CD or DVD, accommodates the recording of 2000 interruptions, which makes this option acceptable. Obviously, if several recordings have been made, only the latest one will be taken into account as the bookmark value.

Operation

Figure 2A:
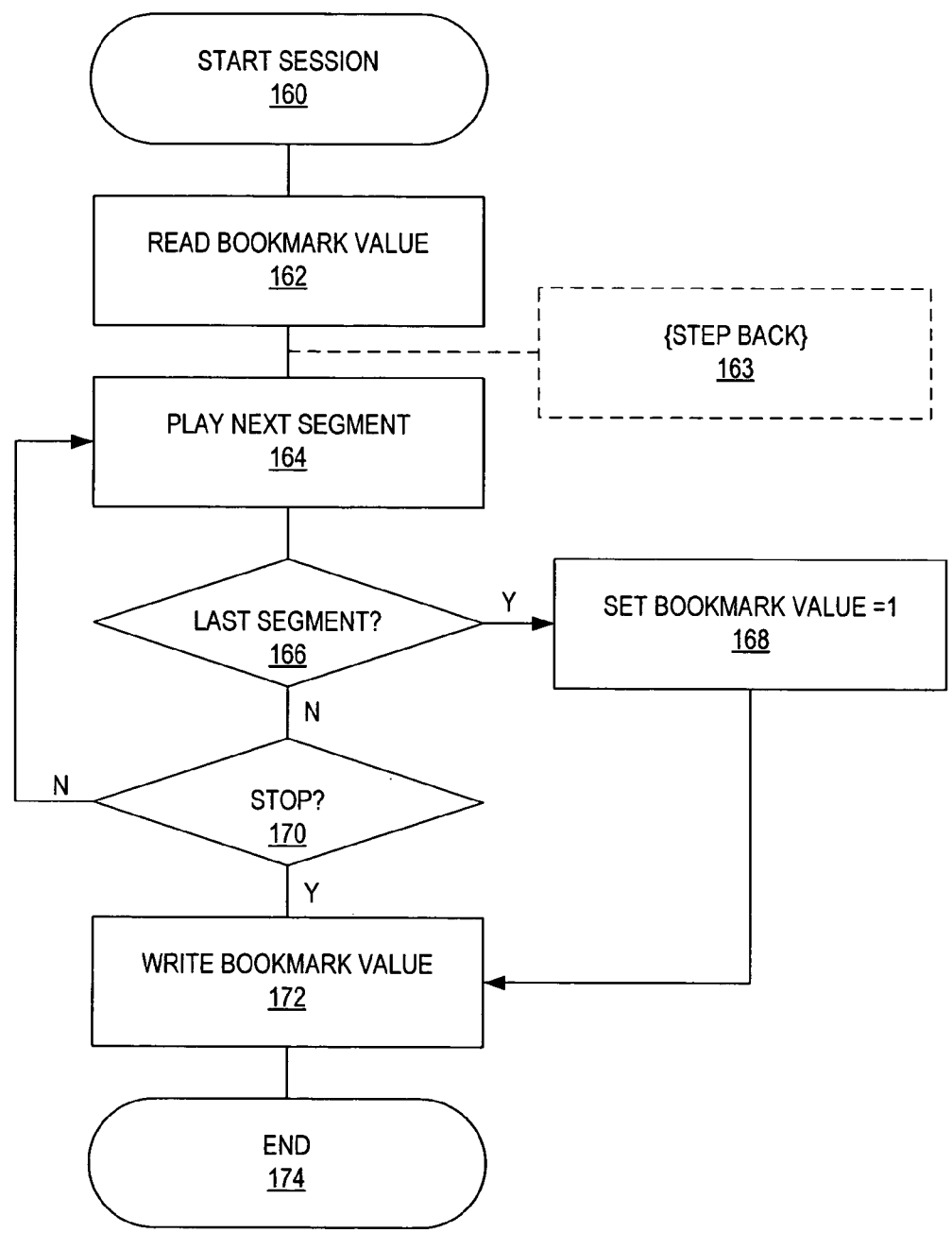
FIG. 2A is a simplified flow chart illustrating a first preferred mode of operation of the embodiments of FIGS. 1-1E.

Reference is made to FIG. 2A, which illustrates a preferred mode of operation of the preferred embodiments of FIGS. 1-1C. In block 160 the user starts a session of content consumption by connecting or inserting medium 110 to player 130 and pressing the appropriate "play" or "resume" buttons on user interface 145 (button not shown). If medium 110 is being used for the first time, or if medium 110 has passed a complete playback, the bookmark value stored in bookmark storage portion 120 is equal to 1. In step 162, processor 140 receives the bookmark value stored in bookmark 120. In optional block 163, if the bookmark value does not point to the beginning of the content piece, the bookmark value is optionally stepped back for user convenience. One example is stepping back by a predetermined number of segments, e.g. 5 seconds, to provide better content continuity for the user. Alternatively, the content is "rewound" to the beginning of the current chapter, if the appropriate table of content is available to processor 140 from content storage portion 115, as is the case with many conventional CD and MP3 players today. In block 164, processor 140 receives the next segment from content storage portion 115 and plays that segment through user interface 145. If this segment is the last segment of the content piece (such as movie, symphony, story), then in step 166 the process is routed to step 168 where the bookmark value is set to 1, which is then recorded in step 172 in bookmark storage portion 120, and operation is terminated in step 174. If the last segment in the content piece has not been reached in step 166, then it is checked in step 170 whether the user has pressed a "stop" or "eject" button on user interface 145 (buttons not shown). If the user has not pressed such a button, the system moves to step 164 to play the next segment. Otherwise the bookmark value (i.e. the address of the next segment to be played) is recorded in bookmark storage portion 120, and the process is terminated in step 174. It will be appreciated that the process of FIG. 2A ensures that the user plays a new content piece from the beginning, while a partly-played piece is played from the interruption point, or slightly before that point, when inserted into the same or a different player 130 using the process of FIG. 2A.

Figure 2B:
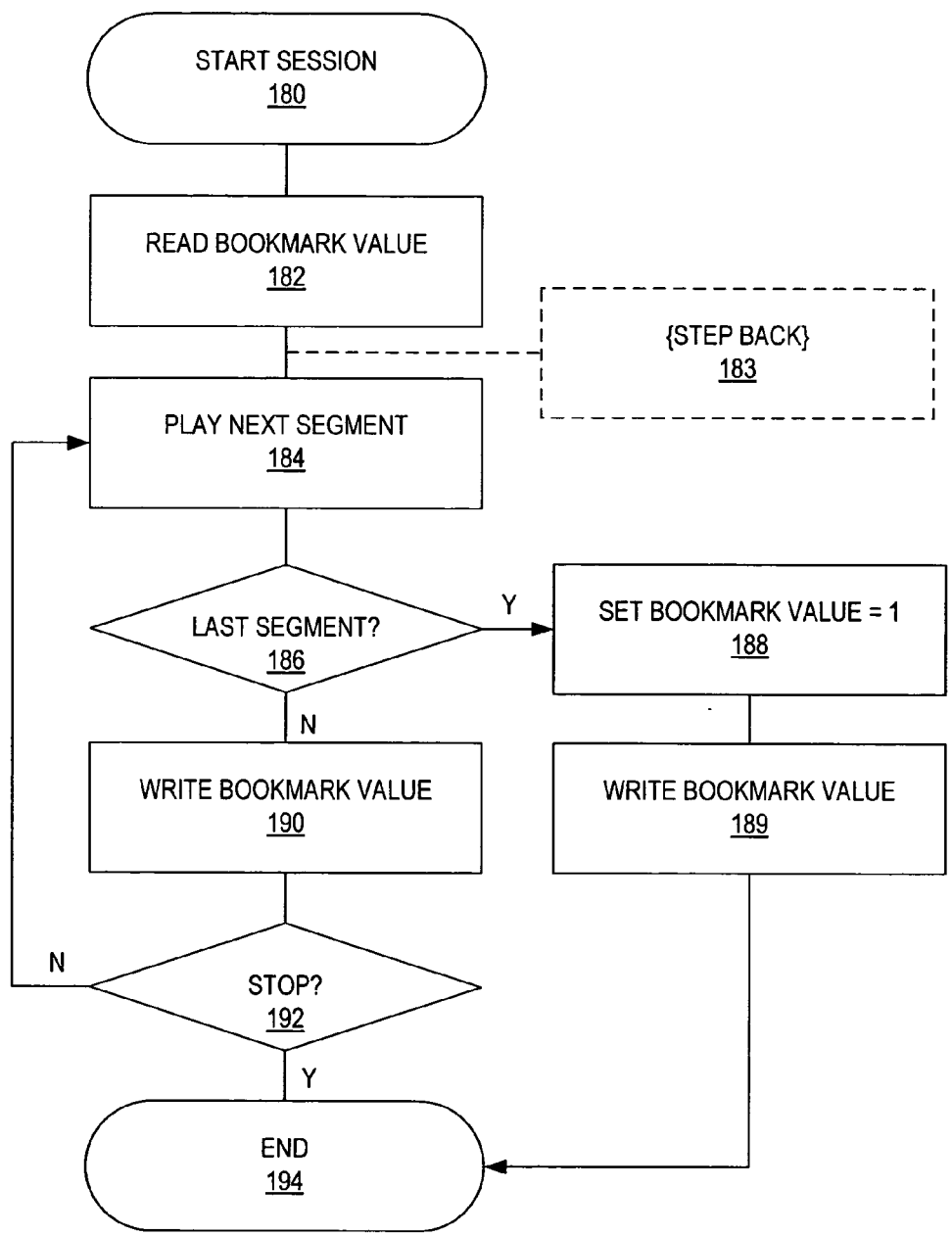
FIG. 2B is a simplified flow chart illustrating a second preferred mode of operation of the embodiments of FIGS. 1-1E.

FIG. 2B illustrates an alternative process to that of FIG. 2A. In the process of FIG. 2B, the bookmark value is continually recorded during operation. Thus starting the session in step 180, reading the bookmark in step 182, optionally stepping back in step 183, playing the next segment is step 184, and checking end of piece in steps 186 and 188, are similar to steps 160, 162, 163, 164, 166 and 168, respectively. If the end of the piece has been reached in block 186, then in step 188 the bookmark value is reset to 1 and in step 189 the bookmark value is recorded in bookmark storage portion 120. Otherwise, in step 190 the bookmark value is recorded in bookmark storage portion 120 before checking whether the user has elected to stop in step 192. It will be appreciated that the process of FIG. 2B yields similar results to that of FIG. 2A. The disadvantage of the process of FIG. 2B relative to the process of FIG. 2A is that the process of FIG. 2B adds many unnecessary write operations with respect to bookmark 120 and is impractical for write-once media. The advantage of the process of FIG. 2B relative to the process of FIG. 2A is that the process of FIG. 2B records the bookmark value not only when the user has stopped operation but also in case of abnormal termination such as upon power failure or player 130 malfunction.

Extended Player Compatibility

The procedures illustrated in FIGS. 2A-2B combine standard playback with novel interrupt and resume operations. The straightforward implementation of the novel operations is by programming processor 140 of player 130 by code from memory 142 (FIG. 1) to execute the procedure of FIG. 2A (or FIG. 2B). However, in some cases the novel aspects of the present invention can be implemented in medium 110 only, which makes the present invention compatible also with many prior art players 130 that are conventional.

Figure 3:
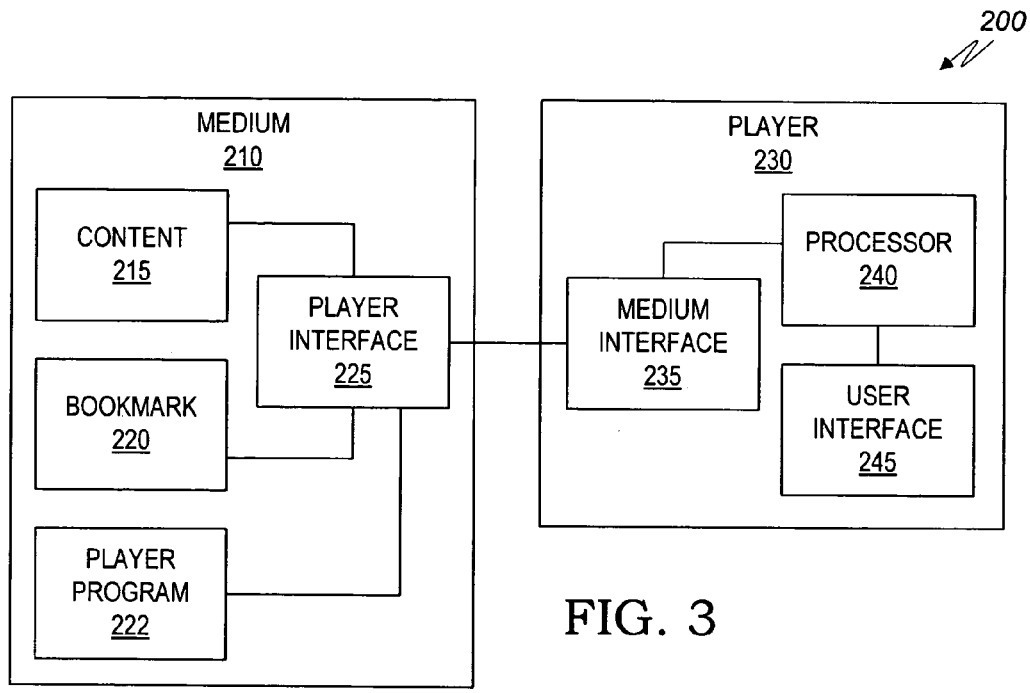
FIG. 3 is a simplified block diagram illustrating a first variant of the preferred embodiment of FIG. 1.

FIG. 3 illustrates a preferred embodiment 200 of a system of the present invention wherein a conventional player 230, similar to player 130 of FIG. 1, is employed, with an additional requirement that processor 240 of player 230 is capable of loading programs from medium 210 of system 200 and executing those programs. This is the case when a current standard personal computer is used as player 230, upon the insertion of a suitable medium such as a CD or a USB magnetic or flash drive. Other than this requirement, processor 240, user interface 245 and medium interface 235 are the same as components 140, 145 and 135 of FIG. 1, respectively, and can be conventional. Medium 210, for example a rewritable CD or a USB flash memory, includes a content storage portion 215, a bookmark portion 220 and a player interface 225 similar to components 115, 120 and 125 of FIG. 1, respectively, and also code storage portion 118 of FIG. 1, in the form of a code storage portion 222. The code stored in code storage portion 222 is a player program implements the procedure of FIG. 2A (or 2B).

Figure 4:
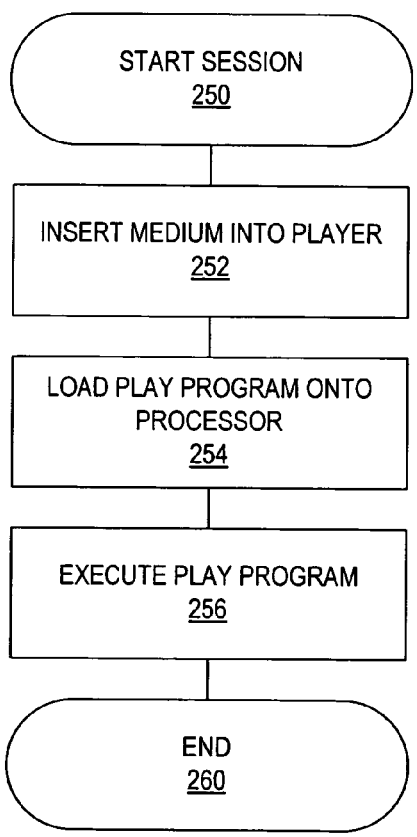
FIG. 4 is a simplified flow chart illustrating a preferred mode of operation of the embodiment of FIG. 3.

FIG. 4 illustrates the operation of the preferred embodiment of FIG. 3. In step 250 the user starts a session by turning on player 230. In step 252 medium 210 is inserted into player 230, thus coupling interfaces 225 and 235. In step 254, processor 240 loads the player program code from code storage portion 222; thus from this point processor 240 is configured to run the procedure of FIG. 2A (or 2B). In step 256 the code is executed in cooperation with content storage portion 215, bookmark storage portion 220 and user interface 245, to provide the functionalities of the present invention.

It will be appreciated that step 254 of FIG. 4 can be executed automatically, provided that code player 230 of FIG. 3 and the player program code in code storage portion 222 of FIG. 3 are configured for Autorun, i.e. automatically detecting and loading a preselected program upon inserting a medium into player 230. Autorun is a feature common in personal computers that can serve as player 230.

Figure 5:
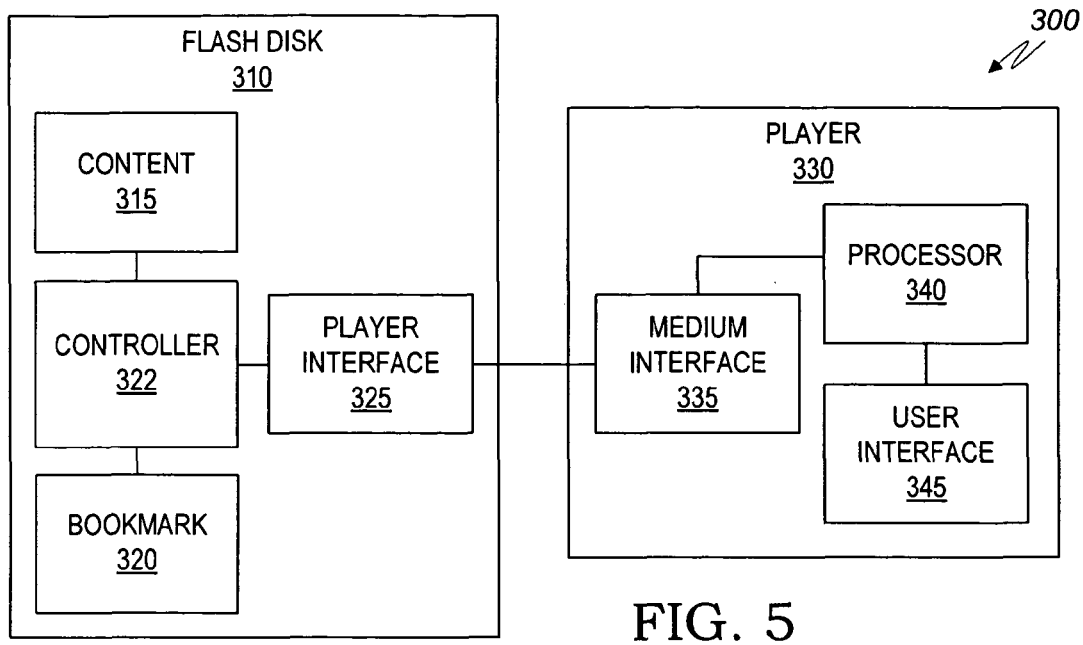
FIG. 5 is a simplified block diagram illustrating a second variant of the preferred embodiment of FIG. 1.

FIG. 5 illustrates a preferred embodiment 300 of a system of the present invention that takes player compatibility even further by making the functionality of the present invention transparent to the player and does not require loading any special program thereto from the medium. Thus player 330 and its components 335, 340 and 345 are as described with respect to components 130, 135, 140 and 145 of FIG. 1, respectively, with the emphasis that processor 340 is conventionally programmed and does not need to load any special program from medium 310 of system 300. The selected medium in this case is a flash memory 310, which includes, in addition to flash content storage 315, flash bookmark storage 320 and player interface 325 (e.g. under MultiMedia or USB standard), also a controller 322 that serves as a block storage device emulator, and includes processing capacity, code and random access memory required to operate flash disk 310 as a mass storage device that is accessible to player 330 through a standard protocol such as a block device protocol. In addition, controller 322 includes processing capacity, code and random access memory for accessing content 315 via a file system that is managed by controller 322. In other words, controller 322 incorporates within flash disk 310 data access power similar to the data access power usually found in players 330. This data access power enables controller 322 to identify both a played content file and the current playing point.

It will be appreciated that flash memories are inherently not structured as conventional mass storage devices, and require a programmed controller in order to emulate a common mass storage device. Such programming is described, for example, in U.S. Pat. No. 5,404,485 and U.S. Pat. No. 5,799,168, both to Ban, and U.S. Pat. No. 6,148,354 to Ban et al., all incorporated herein by reference. Furthermore, U.S. patent application publication 2004/0073727 by Moran et al., filed on 11 Oct. 2002 and incorporated herein by reference, describes how the programmed controller of a flash memory is further enhanced to serve as a file system interface, i.e., to understand and manage a standard file system with respect to the files stored within that flash memory. The teachings of the above patents, as well as knowledge common in the art with respect to the design of players for accessing data files stored on mass storage devices, support the design of controller 322 to perform the procedure of FIG. 6 described below.

Figure 6:
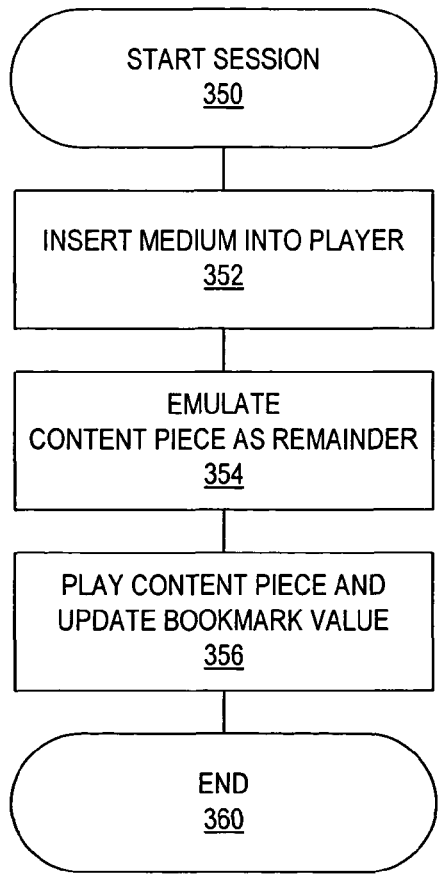
FIG. 6 is a simplified flow chart illustrating a preferred mode of operation of the embodiment of FIG. 5.

Reference is now made to FIG. 6 that illustrates the operation of the preferred embodiment of FIG. 5, starting with the user turning on player 330 in step 350. In step 352, flash memory disk 310 is inserted into player 330. Preferably, flash disk 310 is then energized by power supplied from player 330, and controller 322, serving as a block mass storage device emulator with a file system interface, runs in step 354 through a built-in initialization procedure to configure itself as a mass storage device interface. However, at this stage the bookmark value in bookmark storage portion 320 is read by controller 322, and the emulation of the file that contains the current piece represents the file as starting from the next location after the location defined by bookmark 320. This point will be best clarified by an example: suppose that the content piece is an audio story of 1000 seconds, and that the first 400 seconds have already been played in a previous session, possibly on another player. In this case, when flash disk 310 is inserted into player 330, controller 322 reads from bookmark storage portion 320 the value 400 (determined by the 400 seconds that have been played, see FIG. 2A). Then controller 322 presents the story file to player 330 as if the story file is a 600-sec. file starting at address 401. In step 356 the content piece is played by player 330, while controller 322 takes care of executing the procedure of FIG. 2A (or alternatively FIG. 2B). Thus, if the user selects to interrupt execution through user interface 345, this operation is detected by processor 322, and the bookmark value in bookmark storage portion 320 is updated according to the current consumption coordinate, ready for the next session. In step 360 the procedure is concluded and flash disk 310 can be removed from player 330.

It will be appreciated that under the procedure of FIG. 6, the procedure of FIG. 2A (or 2B) is effected entirely by medium 310 of FIG. 5, thus allowing the implementation of the present invention with compatible players of the prior art without modification or reprogramming. Also, it will be appreciated that the functionalities of controller 322 as described above can be implemented also with non-flash storage devices, for example a removable magnetic disk drive, as long as there exists a controller 322 that can emulate the file representing the content piece as only the remainder of the full file, i.e. the part of the content piece between the address defined initially by the bookmark value in bookmark storage portion 320 and the end of the content piece.

While the invention has been described with respect to a limited number of embodiments, it will be appreciated that many variations, modifications and other applications of the invention may be made.

What is claimed is:

1. A system comprising:
    a MultiMedia card including a flash memory, the MultiMedia card including an interface configured to connect to and disconnect from a host for playing content stored in the flash memory, the flash memory comprising:
    (a) a content storage portion for storing the content in the flash memory;
    (b) a bookmark storage portion for storing, in the flash memory, a bookmark value that indicates a current location within the content upon interruption of playing of the content: and
    (c) a code storage portion for storing a player program that is loaded from the flash memory of the MultiMedia card and executed by the host when the flash memory is connected to the host, wherein the player program controls the host to play the content, including resuming playing of the content in accordance with said bookmark value.

2. The system of claim 1, wherein said bookmark value is stored in said bookmark storage portion only by the host.

3. The system of claim 1, wherein said content storage portion is recordable.

4. The system of claim 1, wherein said content storage portion is rewritable.

5. The system of claim 1, wherein said bookmark storage portion is rewritable.

6. The system of claim 1, wherein said bookmark storage portion is recordable.

7. A system comprising:
    a USB flash drive including a flash memory having computer-readable code embodied in said flash memory, the USB flash drive including an interface configured to connect to and disconnect from a host for playing content stored in the flash memory, said flash memory comprising:
    (a) content stored in said flash memory;
    (b) a bookmark value of said content stored in said flash memory, wherein the bookmark value indicates a current location within the content upon interruption of playing of the content; and
    (c) a player program stored in said flash memory and loaded from said flash memory of said USB flash drive and executed by a host for controlling the host to play the content, including resuming playing of said content in accordance with said bookmark value.

* * * * *